United States Patent [19]

Konno et al.

[11] Patent Number: 5,294,992
[45] Date of Patent: Mar. 15, 1994

[54] DRIVING METHOD FOR PHOTOCONDUCTIVE-TYPE SLM

[75] Inventors: Toshio Konno, Tokyo; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka, all of Japan

[73] Assignee: Victor Company of Japan, Ltd., Yokohama, Japan

[21] Appl. No.: 878,080

[22] Filed: May 4, 1992

[30] Foreign Application Priority Data

May 8, 1991 [JP] Japan .................. 3-132009

[51] Int. Cl.$^5$ .............................. H04N 5/74
[52] U.S. Cl. ................................. 348/767
[58] Field of Search ............ 358/231, 236, 60, 41–43; H04N 5/74

[56] References Cited

U.S. PATENT DOCUMENTS

| 3,957,349 | 5/1976 | Nelson . | |
|---|---|---|---|
| 4,019,807 | 4/1977 | Boswell et al. . | |
| 4,818,983 | 4/1989 | Hara et al. | 358/236 X |
| 5,003,402 | 3/1991 | Takanashi et al. | 358/41 X |
| 5,099,261 | 3/1992 | Takanashi et al. | 358/43 X |

FOREIGN PATENT DOCUMENTS

0376282 7/1990 European Pat. Off. .
1337171 12/1989 Japan .

*Primary Examiner*—Mark R. Powell
*Attorney, Agent, or Firm*—Lowe, Price, LeBlanc & Becker

[57] ABSTRACT

A light-light transfer method using a spatial light modulator realizes an image display with a high utilizing of light without causing an undesirable residual image. The spatial light modulator is constituted to include two electrodes and at least a photoconductor layer member and a photo-modulation layer member used in a birefringence operating mode both being sandwiched between the two electrodes. A writing light is entered from the photoconductive layer member side so that its exposure value varies from the minimum exposure value to the maximum exposure value in a condition that a predetermined operation voltage is supplied between the two electrodes. In this instant, a voltage applied between both ends of the photo-modulation layer member corresponds to a voltage obtained by subtracting a voltage drop amount, occurring in the photoconductor layer member due to an incidence of the writing light, from said predetermined operation voltage applied in advance between said two electrodes. An operational condition of the spatial light modulator is set so that the voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member, at the timing when the writing light of the maximum exposure value is entered into the spatial light modulator.

5 Claims, 5 Drawing Sheets

DRIVING METHOD FOR PHOTOCONDUCTIVE-TYPE SLM

BACKGROUND OF THE INVENTION

1. Field of the Invention

The present invention relates to a light-light transfer method using a spatial light modulator and its display apparatus.

2. Description of the Related Art

There has been conventionally known a display apparatus in which light fluxes having intensities modulated by serial information are projected on a screen by a projection-optics system so that a two-dimensional image display can be realized. However, in such a conventional technology wherein light signals having intensities modulated based on respective picture element signals of the image signal are scanned in a horizontal direction and a vertical direction, even if required to form an optical two-dimensional image which is highly bright and has high-resolution by use of serial signals; for example, a highly accurate two-dimensional image resembling a real time condition in which 4000 picture elements are arranged in both a longitudinal direction and a lateral direction, such a requirement could not be satisfied because there was no signal transfer element capable of realizing it.

Previously Proposed Art

In order to solve the above problems, an applicant of the present application has previously proposed a display apparatus capable of desirably resolving these problems and displaying a highly-bright and highly accurate image in an extremely simple way, wherein for example a light flux having a straight-line cross section emitted from a light source enters into a photo-modulation portion having a construction such that numerous modulating members are provided so as to correspond to respective picture elements based on picture element information, and said light flux exits as a light flux having a straight-line cross section with intensities modulated on the basis of respective picture elements in a direction of a straight-line of said light flux having a straight-line cross section entered into the photo-modulation portion, and further said modulated light flux emitted from the photo-modulation portion is deflected by a polygon mirror in a horizontal direction at intervals of a predetermined cycle to enter a projection lens so that a two-dimensional image can be projected on a screen. (Refer to, for example, a specification of Japanese Unexamined Patent Application No. HEI 1-SS7171, corresponding to the U.S. patent application Ser. No. 07/633,223)

Improved-Type of Previously Proposed Art

However, in an above-described proposed apparatus, there was a problem such that an action speed of a light intensity modulation was slow.

Figure 12:
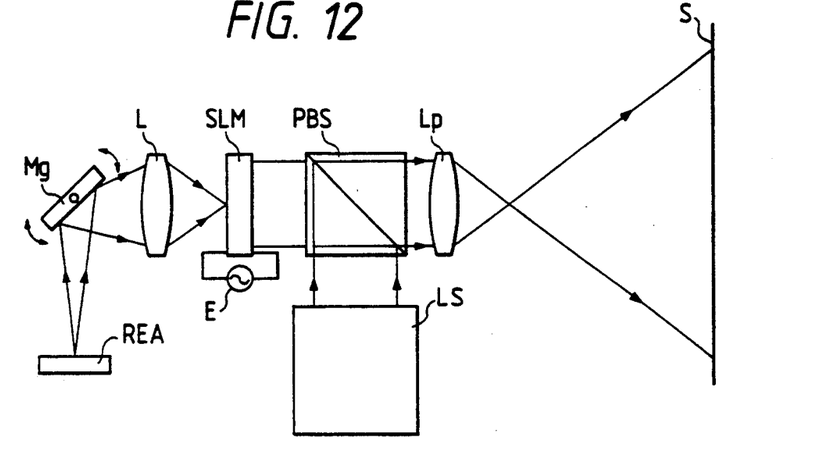
FIG. 12 is a perspective view showing a display apparatus constituted by use of a conventional spatial light modulator.

In response to the need to solve this problem, the applicant has further previously proposed a display apparatus exemplarily shown in FIG. 12. That is, in this display apparatus, there is provided a light-emitting element array having N light emitting elements disposed in a row so as to correspond to respective N picture elements, and these light-emitting elements are supplied information from respective corresponding picture elements during a predetermined period of time, so that said N light emitting elements in the light-emitting element array can simultaneously emit lights during that predetermined period of time.

Then, the light emitted from respective light-emitting elements in the light-emitting element array are simultaneously deflected in a direction normal to a line-up direction of the lights emitted from respective light-emitting elements in the light-emitting element, and said deflected lights are image-formed in a photo-modulation layer member of a spatial light modulator constituted to include at least a photoconductive layer member and the photo-modulation layer member disposed between two electrodes. And further, by applying a reading-out light to the spatial light modulator, the image information read out from the spatial light modulator are projected on a screen.

In FIG. 12, a reference symbol REA denotes a light-emitting element array including N light emitting elements disposed in a row so as to correspond to N picture elements (Here, the letter N means a certain natural number). Writing lights emitted from the N light-emitting elements in the light-emitting element array REA are simultaneously emitted during a predetermined period of time with intensities in accordance with information of N picture elements disposed on a line of image to be displayed.

That is, in the case where image information to be displayed are supplied as serial image signals from a signal source of image information to a display apparatus, for example, N pieces of picture element information in the serial image signals outputted from the signal source of the image information are converted into parallel signals by a serial/parallel converter circuit (for example, a shift register) so as to be supplied to the light-emitting element array REA.

N pieces of light flux emitted from the N light-emitting elements in the light emitting diode array REA have their intensities modified on the basis of N pieces of picture element information enter an optical scanning device such as a swing mirror Mg or a polygon mirror. {Hereinafter, the swing mirror (i.e. a galvano mirror) is used for an explanation of this embodiment}

Since the swing mirror Mg is swung in a direction of an arrow in the drawing at intervals of a predetermined cycle, the light flux entered into the swing mirror Mg repeats an action to shift from a top to bottom of spatial light modulator SLM at a constant shifting speed, so that the light flux can be projected through a lens L on the spatial light modulator SLM. Then, the lights are image-formed as writing lights in the photoconductive layer member of the spatial light modulator SLM, thus the image information to be displayed are written into the spatial light modulator SLM.

In such a light-emitting element array REA, a light flux with intensities modulated based on N pieces of picture element information corresponding to one line on an image to be displayed is emitted from N light emitting elements disposed on a line during a predetermined period of time. After this predetermined period of time has elapsed, an another light flux with intensities modulated based on N pieces of picture element information corresponding to another one line on the image to be displayed is emitted during the predetermined period of time. That is, the light flux with intensities modulated based on N pieces of picture element information corresponding to each one of the lines on the image to be displayed is successively emitted during the predetermined period of time so that bright writing lights can be supplied on the spatial light modulator SLM.

Construction and Operation of Spatial Light Modulator

Figure 2:
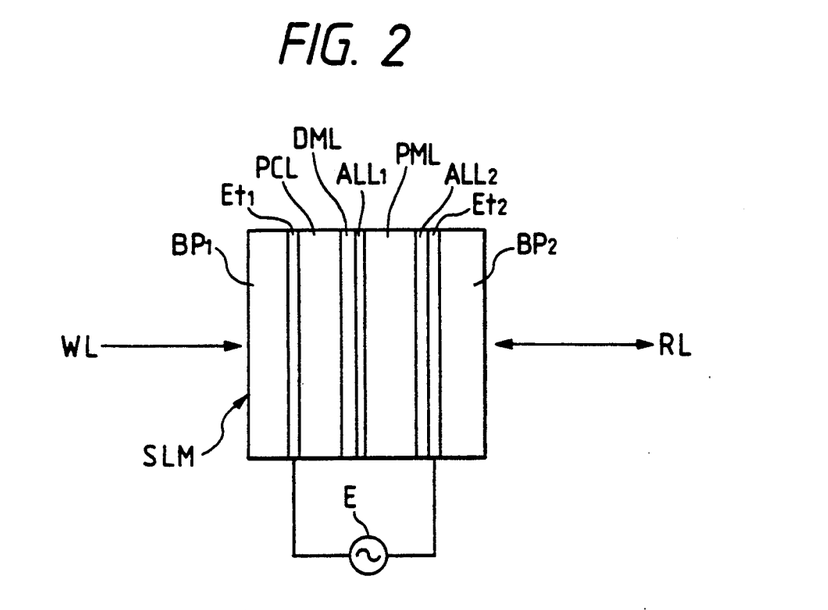
FIG. 2 is a side cross-sectional view of one example of the spatial light modulator.

The following is a description of a constitution and an operation of above-described spatial light modulator SLM with reference to FIG. 2.

A so-called reflection-type spatial light modulator, which is constituted by laminating a transparent substrate BP1, a transparent electrode Et1, a photoconductive layer member PCL, a dielectric mirror DML, aligning films ALL1, ALL2, a photo-modulation layer member PML, a transparent electrode Et2, and a transparent substrate BP2 as shown in FIG. 2, can be used as the spatial light modulator SLM used in the above-described display apparatus shown in FIG. 12. Or, a not-shown transparent type spatial light modulator can be also used.

In the spatial light modulator SLM of FIG. 2, the transparent electrode Et1, Et2 are constituted by films of transparent conductive material, and the photoconductive layer member PCL is made of a material having a photo-conductivity in a wavelength band of light to be used. And, a well-known multi-layer film to reflect light of a predetermined wavelength band can be used as the dielectric mirror DML. Furthermore, a photo-modulation material varying light condition on the basis of the applied field intensity; for example, a crystal having electro-optical effect, a liquid crystal showing a birefringence characteristics, or other photo-modulation layer member can be used as the photo-modulation layer member PML. Moreover, in FIG. 2, a letter E denotes an AC electric power source of any frequency for applying a predetermined voltage between the transparent electrodes Et1, Et2.

In FIG. 2, a reference symbol WL denotes a writing light which is entered from the substrate BP1 side of the spatial light modulator SLM and focused in the photoconductive layer member PCL, and this writing light has an intensity modified based on information to be displayed. With these arrangement of the display apparatus shown in FIG. 12, when the electric power source E supplies a predetermined voltage between the transparent electrodes Et1, Et2, the N pieces of writing light flux with modulated intensities in accordance with image information are deflected by the swing mirror Mg and subsequently entered into the photoconductive layer member PCL so as to be focused thereon by the lens L.

The photoconductive layer member PCL changes its electric resistance value in accordance with irradiated quantity of light at a portion where said N pieces of writing light flux have focused. Therefore, charge images corresponding to irradiation quantities of the N pieces of writing light having intensities modulated based on the image information to be displayed are formed at the boundary between the photoconductive layer member PCL and the dielectric mirror DML. That is, charge images are formed in such a manner that a plurality of charges are adequately arrayed so as to have charge amounts corresponding to N pieces of picture information successively applied in the form of serial signals. Accordingly, the N charge images thus formed between the photoconductive layer member PCL and the dielectric mirror DML cause a field to be applied on the photo-modulation layer member PML in the spatial light modulator SLM.

In FIG. 12, a reference symbol LS denotes a light source of a reading-out light. When the reading-out light RL is entered into a polarization beam splitter PBS after having been emitted from the light source LS of the reading-out light, an S-polarization light component of the reading-out light RL is reflected by the polarization beam splitter PBS toward a reading-out side of the spatial light modulator SLM, and entered from the reading-out side transparent substrate BP2 into the spatial light modulator SLM. The reading-out light RL thus entered from the transparent substrate BeP2 of the spatial light modulator SLM reaches to the dielectric mirror DML via a route of the transparent substrate BP2→the transparent electrode Et2→the aligning film ALL2→the photo-modulation layer member pML→the aligning film ALL1→the dielectric mirror DML as previously described with reference to FIG. 2. In turn, the reading-out light after having being reflected at the dielectric mirror DML exits the spatial light modulator SLM via a route of the dielectric mirror DML→the aligning film ALL1→the photo-modulation layer member PML→the aligning film ALL2→the transparent electrode Et2→the transparent substrate BP2.

The light flux of the N reading-out light simultaneously exiting from the spatial light modulator SLM as described above is a light flux having travelled back in the photo-modulation layer member PML which is applied a field by the charge images consisting of arrayed charges with charge amounts corresponding to successive N pieces of picture element information. Therefore, this light flux has polarization planes varied in response to the successive N pieces of picture element information disposed in a row.

The N reading-out lights simultaneously exiting out of the spatial light modulator SLM subsequently enter into the polarization beam splitter PBS. At the same time, a P-polarization light component of above-described incident light is emitted through the polarization beam splitter PBS to the projection lens Lp. Thus, the projection lens Lp projects them on a screen S as N pieces of light spot arrayed in a row.

Problems to be Solved by the Invention

A writing operation of one sheet of image (i.e. one frame of image) by use of the writing light in the spatial light modulator SLM adopted in the display apparatus explained with reference to FIG. 12 is carried out as follows. That is, the N light-emitting elements of the light-emitting element array which are disposed in a row so as to correspond to the N pieces of picture element information repeat an operation to emit simultaneously with intensities respectively corresponding to the picture element information of each light-emitting element during a predetermined period of time; i.e. a duration determined in accordance with a vertical scanning period of time (a line number M arrayed in a vertical direction). This operation is repeated M times in the vertical scanning direction during one complete vertical scanning operation.

By the way, an equivalent circuit of the portion consisting of the photoconductive layer member PCL and the photo-modulation layer member PML in the spatial light modulator SLM is expressed as a passive network including a resistance and a capacitance. Therefore, in the case where a predetermined operation voltage E is applied between the two transparent electrodes Et1, Et2, and a reading-out light with a constant intensity is given to the spatial light modulator SLM, if a writing light is given to the spatial light modulator SLM, for example, as shown in the lower part of FIG. 13 wherein a writing light is given with an exposure value (i.e. light intensity×time) corresponding to a light intensity of Iw1 given during a time period $\Gamma$ from a time t1 to a time t2, a change of intensity of reading-out light exiting from the spatial light modulator is shown with respect to a time-axis as shown in the upper part of FIG. 13.

Figure 13:
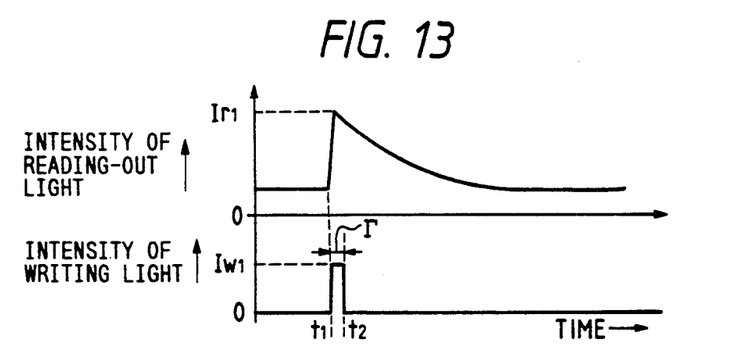
FIG. 13 is a graph showing an intensity of the writing light and a curve of a changing characteristic of the intensity of the reading-out light read out from the spatial light modulator with respect to a time-axis.

Namely the intensity of the reading-out light decreases exponentially with respect to the time-axis. Therefore, a voltage applied between both ends of the photo-modulation layer member PML in the spatial light modulator SLM decreases exponentially in a similar manner with respect to the time-axis in accordance with a time constant of the component consisting of the photoconductive layer member PCL and the photo-modulation layer PML in the spatial light modulator SLM, starting from a voltage obtained by subtracting an amount of a voltage drop, occurring in the photoconductive layer member PCL when the writing light with above-described exposure value is applied, from the predetermined operation voltage E applied in advance between two transparent electrodes Et1, Et2. Referring to FIG. 13, the intensity of the reading-out light read out from the spatial light modulator SLM decreases exponentially with respect to the time-axis from a value of Ir1 as shown in the upper part of FIG. 13.

As a result, a brightness of each picture element of the display image displayed by the reading-out light from the spatial light modulator SLM decreases exponentially with respect to the time-axis.

Therefore, in the case where the time constant of the component consisting of the photoconductive layer member PCL and the photo-modulation layer PML in the spatial light modulator SLM is fairly long compared with one frame period of image to be displayed in the display apparatus, a bright display image can be obtained but a strong residual image remains. To the contrary, in the case where the time constant of the component consisting of the photoconductive layer member PCL and the photo-modulation layer PML in the spatial light modulator SLM is short compared with one frame period of image to be displayed in the display apparatus, a residual image does not remain but a bright display image can not be obtained.

Consequently, a conventional spatial light modulator is constituted by a photoconductive layer member PCL and a photo-modulation layer member with materials, film thicknesses, actuating frequencies, intensities of writing lights etc. which are selected to optimize the responsibility of the spatial light modulator SLM including the time constant of the component consisting of the photoconductive layer member PCL and the photo-modulation layer PML in the spatial light modulator SLM.

Figure 14:
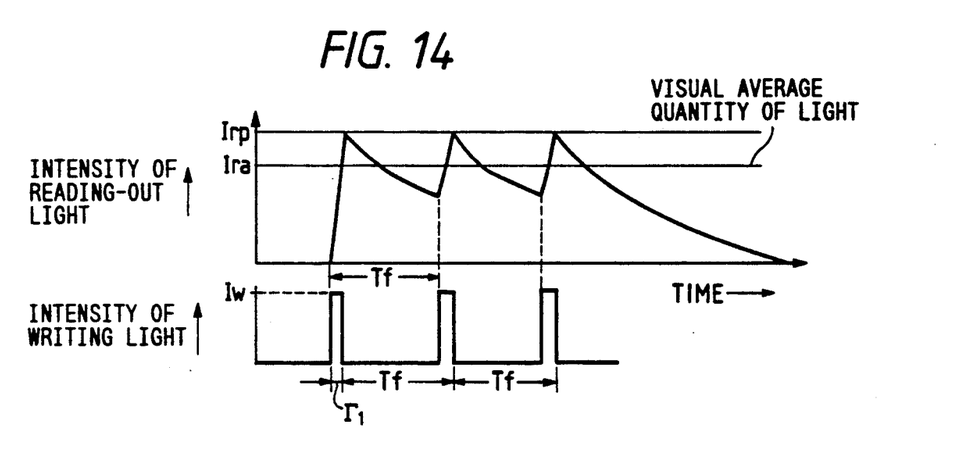
FIG. 14 is a graph showing an intensity of the writing light and a curve of a changing characteristic of the intensity of the reading-out light read out from the spatial light modulator with respect to a time-axis.

FIG. 14 shows an intensity change of the reading-out light with respect to the time-axis when the reading-out light is read out from a specific one picture element portion in the spatial light modulator. The spatial light modulator SLM used in FIG. 14 has a residual image characteristic such that the intensity of the reading-out light read out from the spatial light modulator SLM reduces to 10% of an initial amount after a period of time corresponding to three frames of the image to be displayed has elapsed. Furthermore, in this case, a writing light with exposure value equivalent to a light intensity of Iw having a time width $\Gamma1$ is exposed to the spatial light modulator SLM at intervals of one frame period Tf. An intensity Ira of the reading-out light in FIG. 14 expresses a visual average quantity of light which is averaged by an after-image characteristic of human eyes.

If the spatial light modulator SLM having such a characteristic as shown in FIG. 14 is used in a display apparatus, a person who observes a displayed image would recognize a brightness of the displayed image as the visual average quantity of light in the drawing. However, an intensity of an actual reading-out light always supplied from the reading-out light source to the spatial light modulator SLM is equal to an intensity of Irp shown in FIG. 14. Therefore, a quantity of light corresponding to an area sandwiched between a line of Irp and a line of Ira is uselessly wasted without being utilized for display. Thus an utilization ratio of light becomes undesirably low.

In order to increase the utilization ratio of light emitted from the light source, a spatial light modulator having a large time constant can be used. However, at the same time, a large after-image remains. Against such a problem, it was not possible to provide a display apparatus having a high utilization ratio of light and small after-image.

SUMMARY OF THE INVENTION

IT is therefore a primary object of the present invention to provide a light-light transfer method by use of a spatial light modulator and its display apparatus capable of resolving the aforementioned problems and disadvantages encountered in the art.

A first aspect of the present invention provides a light-light transfer method by use of a spatial light modulator wherein said spatial light modulator including two electrodes and at least a photoconductive layer member and a photo-modulation layer member used in a birefringence operating mode both being sandwiched between the two electrodes;

when a writing light is entered from the photoconductive layer member side in such a manner that its exposure value varies from the minimum exposure value to the maximum exposure value in a condition that a predetermined operation voltage is supplied between the two electrodes;

within a voltage applied between both ends of the photo-modulation layer member which value corresponds to a voltage obtained by subtracting a voltage drop amount, which occurs in the photoconductive layer member as a monotonous changing condition due to an incidence of the writing light, from said predetermined operation voltage applied in advance between said two electrodes;

setting an operational condition of the spatial light modulator in such a manner that, at the timing the writing light of the maximum exposure value is entered into the spatial light modulator, a voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member.

And further, a second aspect of the present invention provides a display apparatus comprising:

a light-emitting element array including N light-emitting elements disposed in a row so as to correspond to a plurality of N pieces of picture element information;

an emitting means for emitting said N light-emitting elements on the basis of information from respectively corresponding picture elements;

a deflecting means for simultaneously deflecting lights emitted from respective light-emitting elements of said light-emitting element array in a direction normal to a line-up direction of lights emitted from said respective light-emitting elements;

spatial light modulator including two electrodes and at a least a photoconductive layer member and a photo-modulation layer member used in a birefringence operating mode both being sandwiched between the two electrodes;

an image-forming means for image-forming said lights, which are in a condition of being simultaneously deflected after emitted together from said respective light-emitting elements, on a photoconductive layer element in a spatial light modulator, when a writing light deflected by said deflecting means is entered from the photoconductive layer member side in such a manner that its exposure value varies from the minimum exposure value to the maximum exposure value in a condition that a predetermined operation voltage is supplied between the two electrodes, within a voltage applied between both ends of the photo-modulation layer member which value corresponds to a voltage obtained by subtracting a voltage drop amount, which occurs in the photoconductive layer member as a monotonous changing condition due to an incidence of the writing light, from said predetermined operation voltage applied in advance between said two electrodes, by setting an operational condition of the spatial light modulator in such a manner that, at the timing the writing light of the maximum exposure value is entered into the spatial light modulator, a voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member; and a projecting means for reading out information written in the spatial light modulator by a reading-out light and projecting them on a screen by a projection-optics system.

Accordingly, an operation of the present invention is described as follows.

A spatial light modulator is constituted to include two electrodes and at least a photoconductive layer member and a photo-modulation layer member used in a birefringence operating mode both being sandwiched between the two electrodes.

A writing light is entered from the photoconductive layer member side so that its exposure value varies from the minimum exposure value to the maximum exposure value in a condition that a predetermined operation voltage is supplied between the two electrodes.

In this instant, a value of a voltage applied between both ends of the photo-modulation layer member corresponds to a voltage obtained by subtracting a voltage drop amount, which occurs in the photoconductive layer member as a monotonous changing condition due to an incidence of the writing light, from said predetermined operation voltage applied in advance between said two electrodes.

An operational condition of the spatial light modulator is set so that the voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member, at the timing when the writing light of the maximum exposure value is entered into the spatial light modulator Therefore, it becomes possible to increase an average quantity of reading-out light without changing an inherent time constant of the component consisting of the photoconductive layer member PCL and the photo-modulation layer member PML of the spatial light modulator SLM. Consequently, a display of an image is carried out with a high utilization ratio of light from the light source in such a manner that the information written in the spatial light modulator is read out by the reading-out light and projected on a screen through a projection-optics system with higher brightness.

The above and other objects, features and advantages of the present invention will become more apparent from the following detailed description which is to be read in conjunction with the accompanying drawings.

DETAIL DESCRIPTION OF THE PREFERRED EMBODIMENT

Hereinafter, referring now to the accompany drawings, a specific content in a preferred embodiment of the light-light transfer method by use of the spatial light modulator and its display apparatus in accordance with the present invention is explained in detail.

OVERALL SYSTEM

In the display apparatus constituted by applying the light-light transfer method by use of the spatial light modulator of the present invention as shown FIG. 1, the same components as those of the display apparatus explained with reference to FIG. 12 are suffixed by the same reference numerals as those disclosed in FIG. 12.

Light-Emitting Element Array (REA)

Figure 1:
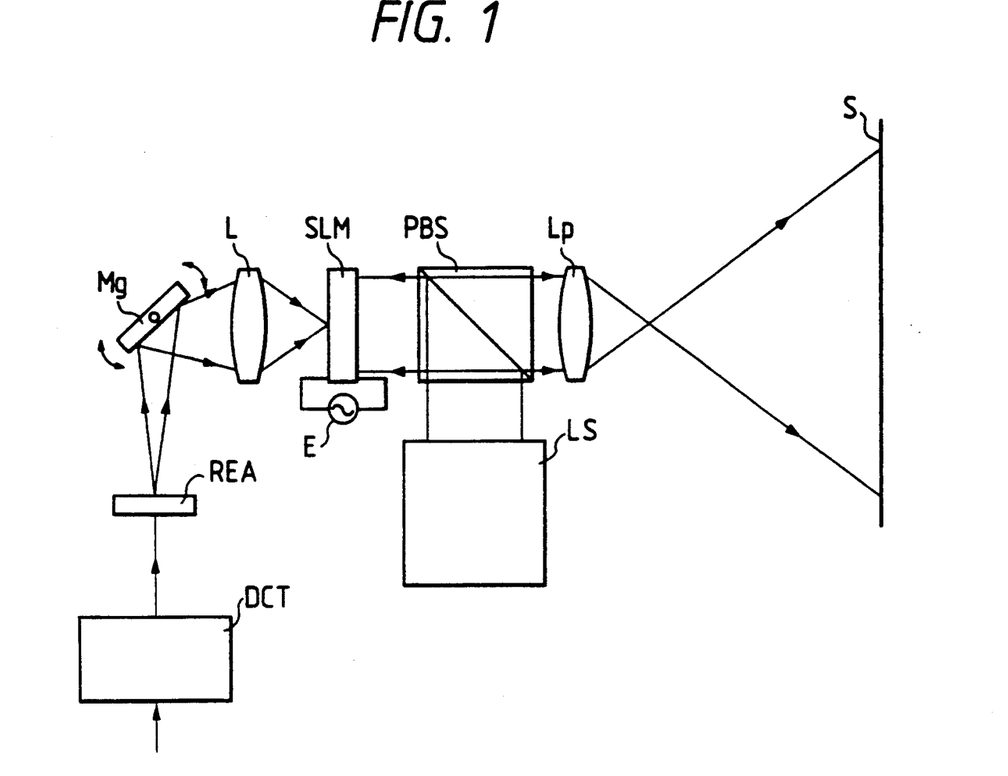
FIG. 1 is a perspective view showing an embodiment of a display apparatus constituted by applying the light-light transfer method by use of the spatial light modulator of the present invention.

In the display apparatus shown in FIG. 1, a reference symbol REA denotes a light-emitting element array including N light-emitting elements disposed in a row so as to correspond to N pieces of picture element information (Here, the letter N means a natural number).

The light-emitting element array REA is, for example, constituted in such a manner that numerous light-emitting elements (e.g. light emitting diodes, semi-conductor lasers etc.) are disposed in a row on a substrate, or a micro-lens array is arranged on the row of the light-emitting elements of the light-emitting element array.

In the display apparatus of FIG. 1, the N light-emitting elements disposed in a row in the light-emitting element array REA are actuated by a driving circuit DCT so that the N pieces of light-emitting element can simultaneously emit lights with intensities respectively modulated in response to each information of the N pieces of picture element information arrayed on one straight-line of an image to be displayed within a predetermined intensity which is described later.

On the other hand, these N light-emitting elements disposed in a row in the light-emitting element array REA can be actuated by the driving circuit DCT so that the N light-emitting elements can respectively emit light with a constant intensity but modulated by a time width instead of modulated by intensity itself in accordance with corresponding information of the N pieces of picture element information arrayed on one straight-line of the image to be displayed.

Even if the light intensity is modulated by the time width as described above, these N light-emitting elements can supply the same quantity of light to a later-described spatial light modulator with the same exposure value as the exposure value supplied to the spatial light modulator by the lights emitted from the respective light-emitting elements in the case where the lights emitted from the N light-emitting elements disposed in a row in the light-emitting element array REA are modulated by their intensities in response to each information of the M pieces of picture element information arrayed on one straight-line of the image to be displayed.

Therefore, it is needless to say that an actuation mode of the driving circuit DCT with respect to the N light-emitting elements disposed in a row in the light-emitting element array REA can be determined to actuate the N light-emitting elements to emit light with a constant intensity but modulated by a time width in accordance with corresponding information of each picture element.

In the following explanation of the embodiment, the N light emitting elements disposed in a row in the light-emitting element array REA are illustrated as light-emitting elements to be actuated by the driving circuit DCT so that the N light emitting elements can simultaneously emit lights with intensities respectively modulated in response to each information of the N pieces of picture element information arrayed on one straight-line of an image to be displayed within a predetermined intensity which is described later.

However, it would be also desirable that these N light emitting elements disposed in a row in the light-emitting element array REA are actuated by the driving circuit DCT so that the N light emitting elements can respectively emit with a constant intensity but modulated by a time width in accordance with corresponding information of the N pieces of picture element information arrayed on one straight-line of the image to be displayed.

Image Information (Light Flux) Path in the Display Apparatus

In the case where above-described image information to be displayed are supplied, for example, as serial image signals from a signal source of image information to the display apparatus, the N pieces of picture element information in the serial image signals outputted from the signal source of the image information are converted into parallel signals by a serial/parallel converter circuit provided in the driving circuit DCT so as to be supplied to the light-emitting element array REA. A shift register can be adopted as the serial/parallel converter.

N pieces of light flux emitted from the N light emitting elements in the light emitting diode array REA having being modified their intensities on the basis of N pieces of picture element information enter through a lens L into an optical scanning device such as a swing mirror Mg o a polygon mirror. {Hereinafter, the swing mirror (i.e. a galvano mirror) is used for an explanation of this embodiment}

Since the swing mirror Mg is swung in a direction of an arrow in the drawing at intervals of a predetermined cycle, the light flux entered into the swing mirror Mg repeats an action to shift from top to bottom of a spatial light modulator SLM at a constant shifting speed, so that the light flux can be projected on the spatial light modulator SLM.

Then, the lights are image-formed as writing lights in the photoconductive layer member of the spatial light modulator SLM, thus the image information to be displayed are written into the spatial light modulator SLM.

Spatial Light Modulator (SLM)

A so-called reflection-type spatial light modulator, which is constituted by laminating a transparent substrate BP1, a transparent electrode Et1, a photoconductive layer member PCL, a dielectric mirror DML, aligning films ALL, a photo-modulation layer member PML, a transparent electrode Et2, and a transparent substrate BP2 as shown in FIG. 2, can be used as the spatial light modulator SLM used in the above-described display apparatus shown in FIG. 1. Or, a not-shown transmission type spatial light modulator can be also used.

However, in the following description of this embodiment, the spatial light modulator SLM is explained as a deflection-type spatial light modulator. Regarding a detail explanation of the constitution and general function of the spatial light modulator SLM is omitted since it is already described with reference to FIG. 2.

Writing Operation of Image Information

In such a light-emitting element array REA, a light flux with intensities modulated based on N pieces of picture element information corresponding to one line on an image to be displayed is emitted from N pieces of light-emitting element disposed on a line during a predetermined period of time.

After this predetermined period of time has elapsed, an another light flux with intensities modulated based on N pieces of picture element information corresponding to another one line on the image to be displayed is emitted during the predetermined period of time.

That is, the light flux with intensities modulated based on N pieces of picture element information corresponding to each one of lines on the image to be displayed is successively emitted during the predetermined period of time so that bright writing lights can be applied on the spatial light modulator SLM.

Figure 3:
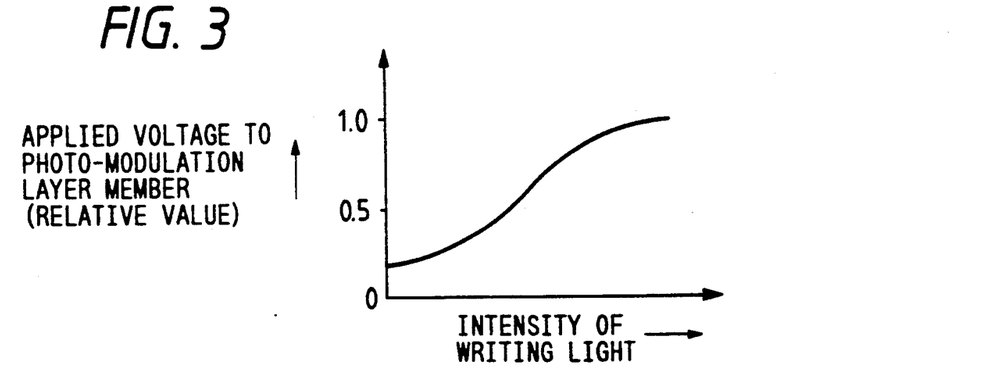
FIG. 3 is a graph of characteristic curve exemplarily showing a relationship between a light intensity of a writing light and a voltage applied between both ends of a photo-modulation layer member.

FIG. 3 is a graph exemplarily showing how a voltage applied between both ends of the photo-modulation layer member PML changes in response to change of intensity of the writing light WL supplied to the spatial light modulator SLM. In the spatial light modulator SLM, when an intensity (or an exposure value) of the writing light WL varies, an electric resistance of the photoconductive layer member PCL which is provided in series with the photo-modulation layer member PML also changes. Therefore, in accordance with the change of intensity (or exposure value) of the writing light WL, a voltage applied between both ends of the photo-modulation layer member PML varies, for example, as shown in FIG. 3.

Reading-Out Operation in the Spatial Light Modulator (SLM)

Figure 4:
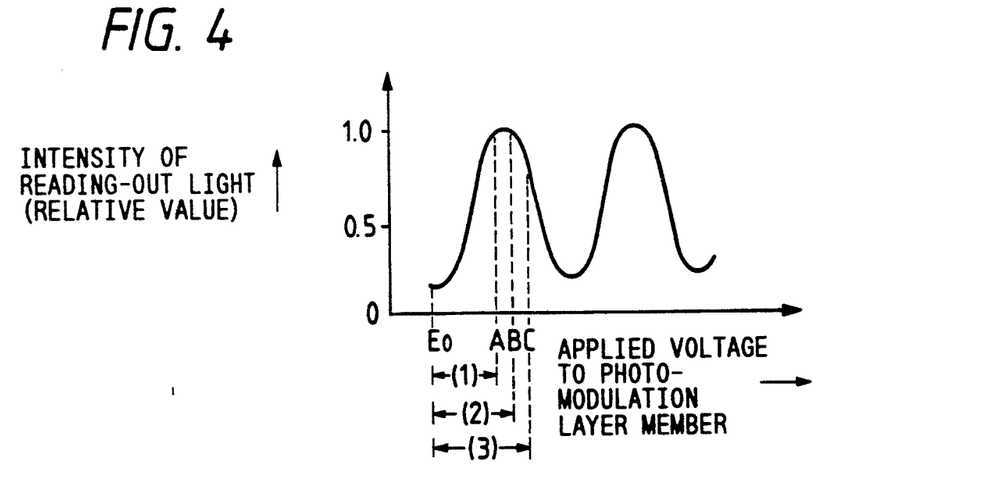
FIG. 4 is a graph of characteristic curve exemplarily showing a relationship between a voltage applied to the photo-modulation layer member and a light intensity of a reading-out light from the spatial light modulator.

FIG. 4 is a graph exemplarily showing how an intensity of a reading-out light emitted from the spatial light modulator SLM, which includes the photo-modulation layer member PML used in the birefringence operating mode, varies in response to a change of voltage value applied between both ends of the photo-modulation layer member PML of the spatial light modulator SLM. In the drawing, an abscissa represents an applied voltage to the photo-modulation layer member, and an ordinate represents an intensity of a reading-out light read out from the spatial light modulator SLM under the condition that the spatial light modulator SLM is exposed to the reading-out light with a constant light intensity.

Figure 6:
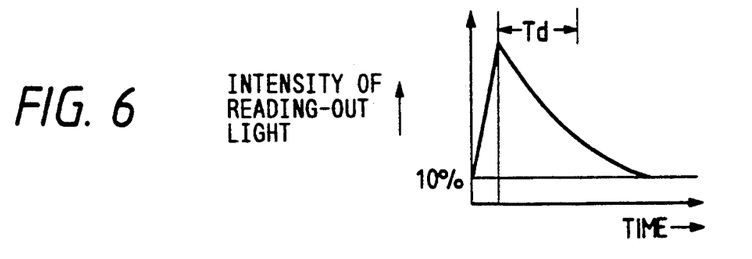
FIG. 6 is a graph showing a curve of a changing characteristic of an intensity of the reading-out light read out from the spatial light modulator with respect to a time-axis.

Furthermore, FIG. 6 shows how the voltage Vp applied between both ends of the photo-modulation layer member PML in the spatial light modulator SLM shown in FIG. 2 changes.

Figure 5:
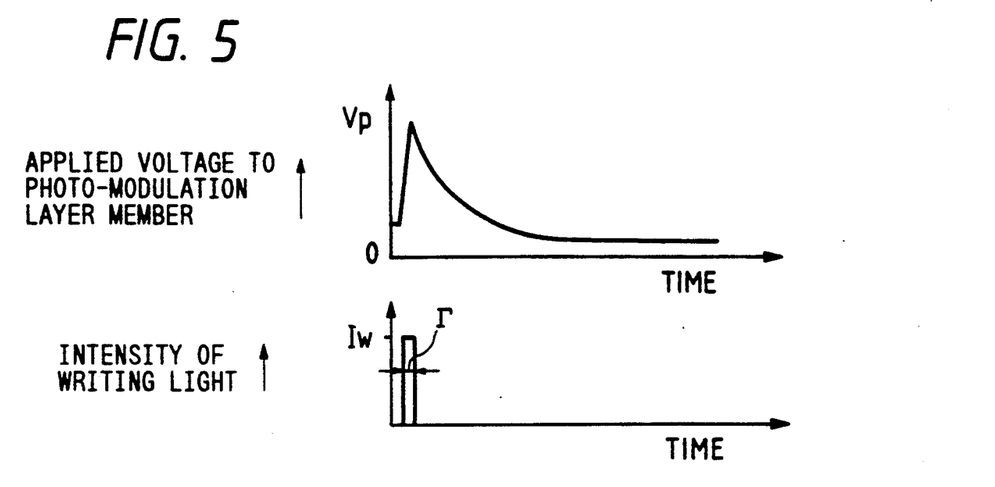
FIG. 5 is a graph of characteristic curves exemplarily showing a relationship between a light intensity of the writing light and a voltage applied between both ends of the photo-modulation layer member and a changing characteristic of the voltage applied between the both ends of the photo-modulation layer member.

That is, in the case where the spatial light modulator is exposed to the writing light with an exposure value determined by a light intensity Iw and a time width $\Gamma$ as shown in a lower part of FIG. 5, the voltage Vp applied between both ends of the photo-modulation layer member PML in the spatial light modulator SLM decreases exponentially with respect to the time-axis in accordance with a time constant of the component consisting of the photoconductive layer member PCL and the photo-modulation layer PM in the spatial light modulator SLM as shown in an upper part of FIG. 6, starting from a voltage obtained by subtracting an amount of a voltage drop, occurring in the photoconductive layer member when the writing light with the intensity Iw is applied, from the predetermined operation voltage E applied in advance between two transparent electrodes Et1, Et2.

Therefore, since the voltage Vp applied between both ends of the photo-modulation layer member PML in the spatial light modulator SLM changes with respect to the time-axis as shown in the upper part of FIG. 6 in the case where the spatial light modulator is exposed to the writing light with an exposure value determined by a light intensity Iw and a time width $\Gamma$, the intensity of the reading-out light read out from the spatial light modulator SLM, under the condition that the reading-out light is always applied to the spatial light modulator SLM with a constant intensity, changes with respect to the time-axis in the same manner as the change of the voltage Vp applied between both ends of the photo-modulation layer member PML in the spatial light modulator as shown in the upper part of FIG. 5.

{1} For example, in the case where a light having an exposure value capable of causing a voltage change E0→A between the both ends of the photo-modulation layer member PML as shown by (1) in FIG. 4 is supplied by the writing light entered into the spatial light modulator SLM such as a light having a time width $\Gamma$ exemplarily shown in FIG. 6, the intensity of the reading-out light read out from the spatial light modulator SLM, under the condition that the reading-out light is always applied to the spatial light modulator SLM with a constant intensity, shows a change with respect to the time-axis as shown in FIG. 6.

Figure 7:
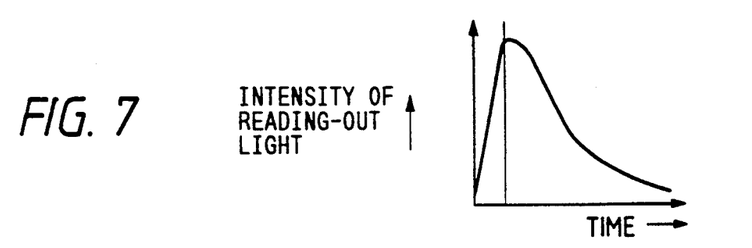
FIG. 7 is a graph showing a curve of a changing characteristic of a intensity of the reading-out light read out from the spatial light modulator with respect to a time-axis.

{2} Furthermore, in the case where a light having an exposure value capable of causing a voltage change E0→B between the both ends of the photo-modulation layer member PML as shown by (2) in FIG. 4 is supplied by the writing light entered into the spatial light modulator SLM such as a light having a time width exemplarily shown in FIG. 5, the intensity of the reading-out light read out from the spatial light modulator SLM, under the condition that the reading-out light is always applied to the spatial light modulator SLM with a constant intensity, shows a change with respect to the time-axis as shown in FIG. 7.

Figure 8:
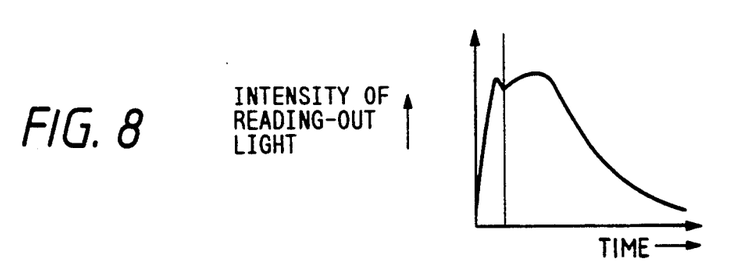
FIG. 8 is a graph showing a curve of a changing characteristic of an intensity of the reading-out light read out from the spatial light modulator with respect to a time-axis.

{3} Moreover, in the case where a light having an exposure value capable of causing a voltage change F0→C between the both ends of the photo-modulation layer member PML as shown by (3) in FIG. 4 is supplied by the writing light entered into the spatial light modulator SLM such as a light having a time width Γ exemplarily shown in FIG. 5, the intensity of the reading-out light read out from the spatial light modulator SLM, under the condition that the reading-out light is always applied to the spatial light modulator SLM with a constant intensity, shows a change with respect to the time-axis as shown in FIG. 8.

Reading-Out Operation in the Background-Art

By the way, the conventional spatial light modulator is operated, for example, by the use of a writing light having a time width Γ as shown in FIG. 5 with an exposure value capable of causing a voltage change E0→A between the both ends of the photo-modulation layer member PML as shown by (1) in FIG. 4.

Therefore, the intensity of the reading-out light read out from the spatial light modulator SLM, under the condition that the reading-out light is always applied to the spatial light modulator SLM with a constant intensity, shows a change with respect to the time-axis as shown in FIG. 6.

Namely, the intensity of the reading-out light in the background-art showed an exponential decrease with respect to the time-axis. (In the drawing, a reference symbol Td denotes a time constant)

Reading-Out Operation in Accordance with the Present Invention

However, according to the light-light transfer method by the spatial light modulator of the present invention, the spatial light modulator is operated, for example, by the use of a writing light having a time width Γ with an exposure value capable of causing a voltage change E0→B or E0→C between the both ends of the photo-modulation layer member PML as shown by (2) or (3) in FIG. 4.

That is, a light-light transfer is carried out by a spatial light modulator which includes two electrodes Et1, Et2 and at least a photoconductive layer member PCL and a photo-modulation layer member PML used in a birefringence operating mode both being sandwiched between the two electrodes Et1, Et2 in such a manner;

when a writing light is entered from the photoconductive layer member PCL side so as to vary its exposure value from the minimum exposure value to the maximum exposure value in a condition that a predetermined operation voltage E is supplied between the two electrodes Et1, Et2;

within a voltage applied between both ends of the photo-modulation layer member PML which value corresponds to a voltage obtained by subtracting a voltage drop amount, which occurs in the photoconductive layer member PCL as a monotonous changing condition due to an incidence of the writing light, from said predetermined operation voltage E applied in advance between said two electrodes Et1, Et2;

an operational condition of the spatial light modulator is set so that, at the timing the writing light of the maximum exposure value is entered into the spatial light modulator, a voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member.

Adjustment of Applied Voltage to Photo-Modulation Layer Member (PML)

The electric power source E can be controlled so as to change its frequency and its voltage. As already explained in the forgoing description, the voltage applied between both ends of the photo-modulation layer member PML varies relatively as an electric resistance (i.e. an impedance) of the photoconductive layer member PCL varies. The impedance of the photoconductive layer member PCL can be changed by controlling its frequency and/or its voltage. Therefore, it is possible to control the voltage applied between both ends of the photo-modulation layer member PML so as to exceed an extreme point at which an intensity of reading-out light takes an extreme value of FIG. 4 by changing the frequency and/or voltage of the electric power source E. Accordingly, the electric power source E can be controlled to cause a voltage change E0→B or F0→C between the both ends of the photo-modulation layer member PML as shown by (2) or (3) in FIG. 4, in accordance with a changing range of intensity of the light-emitting element.

On the other hand, the driving circuit DCT can control, as an alternative means, the intensity of light emitted from the light-emitting element in such a manner that, when a writing light corresponding to a peak gradation of image information is applied to the spatial light modulator SLM, a voltage applied between both ends of the photo-modulation layer member PML exceeds an extreme point at which an intensity of reading-out light takes an extreme value of FIG. 4.

Intensity of Reading-Out Light by the Present Invention

Accordingly, when the light-light transfer is carried out in accordance with the light-light transfer method by the spatial light modulator of the present invention, even if the spatial light modulator having the same time constant as the conventional spatial light modulator is used, a time-integration value of the reading-out light emitted from the spatial light modulator SLM becomes large compared with a time-integration value of the reading-out light curve shown as a conventional example in FIG. 6, as apparent from, for example, exemplary curves shown in FIGS. 7 and 8.

That is, in case of FIGS. 7 and 8, the reading-out light changes its intensity so as to follow a curve B→E0 or C→E0 of FIG. 4, after the writing light has been extinguished. Therefore, in case of FIGS. 7 and 8, reading-out light can maintain its peak intensity at an instant shortly after the writing light is extinguished. Thus, the time-integration value of the reading-out light becomes larger than that of the conventional example. Therefore, it becomes possible to easily obtain a bright display image compared with the conventional light-light transfer method.

Figure 10A:
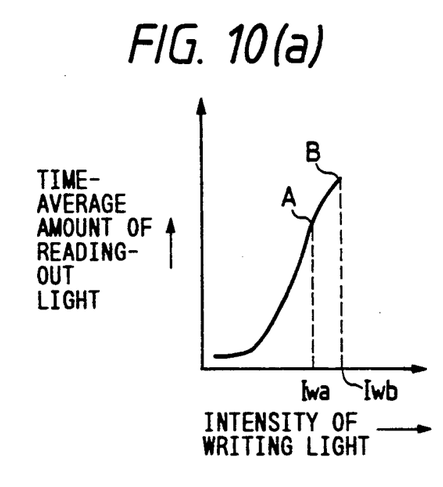
FIG. 10 is graphs of curves each showing a relationship between an intensity of the writing light and a time-average amount of the reading-out light read out from the spatial light modulator.
Figure 10B:
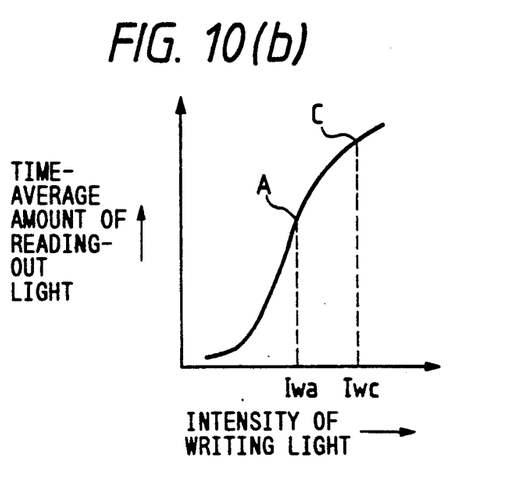

This fact is also apparent from FIGS. 10 (a) and 10 (b) which respectively show an example of a relationship between an exposure value of a writing light and a time-average quantity of reading-out light.

FIG. 10 (a) is a graph showing a comparison of time-average of quantity of reading-out light between the case where a writing operation of the spatial light modulator SLM is carried out by the use of the writing light with an exposure value capable of causing a voltage change E0→A between the both ends of the photo-modulation layer member PML as shown by (1) in FIG. 4; i.e. by the use of the writing light, for example, having a time width Γ as shown in FIG. 5 with an intensity of Iwa, and the case where a writing operation of the spatial light modulator SLM is carried out by the use of the writing light with an exposure value capable of causing a voltage change E0→B between the both ends of the photo-modulation layer member PML as shown by (2) in FIG. 4; i.e. by the use of the writing light, for example, having a time width Γ as shown in FIG. 6 with an intensity of Iwb.

On the other hand, FIG. 10 (b) is a graph showing a comparison of time-average of quantity of reading-out light between the case where a writing operation of the spatial light modulator SLM is carried out by the use of the writing light with an exposure value capable of causing a voltage change E0→A between the both ends of the photo-modulation layer member PML as shown by (1) in FIG. 4; i.e. by the use of the writing light, for example, having a time width Γ as shown in FIG. 5 with an intensity of Iwa, and the case where a writing operation of the spatial light modulator SLM is carried out by the use of the writing light with an exposure value capable of causing a voltage change E0→C between the both ends of the photo-modulation layer member PML as shown by (3) in FIG. 4; i.e. by the use of the writing light, for example, having a time width Γ as shown in FIG. 6 with an intensity of Iwc.

Visual Average Quantity of Reading-Out Light by the Present Invention

Figure 9:
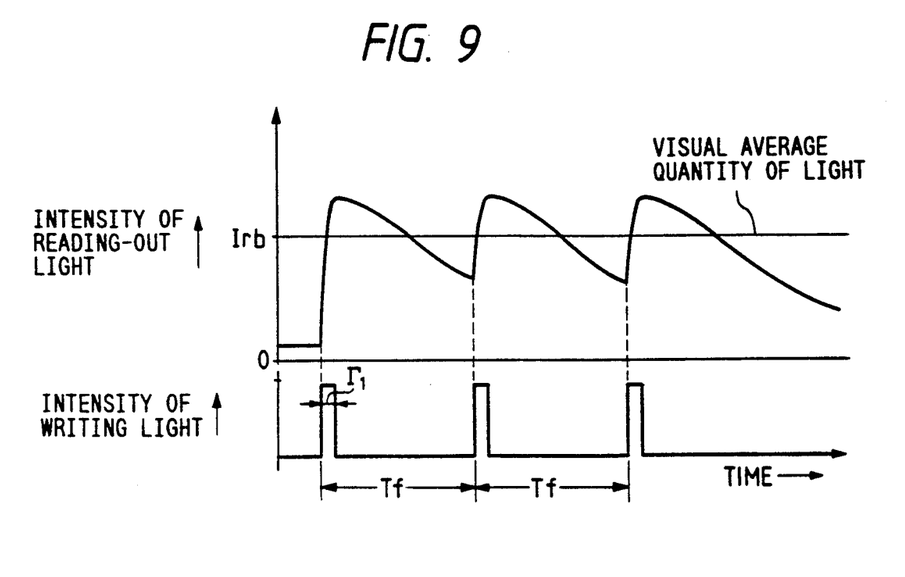
FIG. 9 is a graph showing an intensity of the writing light and a curve of a changing characteristic of the intensity of the reading-out light read out from the spatial light modulator with respect to a time-axis.

FIG. 9 shows an intensity change of the reading-out light with respect to the time-axis when the reading-out light is read out from a specific one picture element portion in the spatial light modulator. The spatial light modulator used in FIG. 9 has a residual image characteristic such that the intensity of the reading-out light read out from the spatial light modulator reduces to 10% of an initial amount after a period of time corresponding to three frames of the image to be displayed has elapsed.

Furthermore, in this case, a writing light with exposure value equivalent to a light intensity of Iwb having a time width Γ1 as shown in FIG. 10 (a) is exposed to the spatial light modulator at intervals of one frame period Tf. An intensity Irb of the reading-out light in FIG. 9 expresses a visual average quantity of light which is averaged by an after-image characteristic of human eyes.

Figure 11:
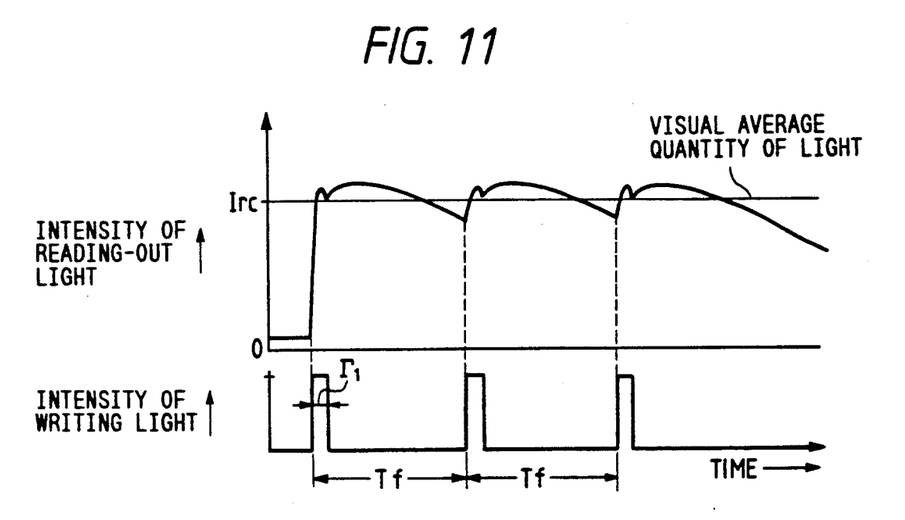
FIG. 11 is a graph showing an intensity of the writing light and a curve of a changing characteristic of the intensity of the reading-out light read out from the spatial light modulator with respect to a time-axis.

FIG. 11 also shows an intensity change of the reading-out light with respect to the time-axis when the reading-out light is read out from a specific one picture element portion in the spatial light modulator. The spatial light modulator used in FIG. 11 has a residual image characteristic such that the intensity of the reading-out light read out from the spatial light modulator reduces to 10% of an initial amount after a period of time corresponding to three frames of the image to be displayed has elapsed.

Furthermore, in this case, a writing light with exposure value equivalent to a light intensity of Iwc having a time width Γ1 as shown in FIG. 10 (b) is exposed to the spatial light modulator at intervals of one frame period Tf. An intensity Irc of the reading-out light in FIG. 11 expresses a visual average quantity of light which is averaged by an after-image characteristic of human eyes.

Display Operation

In the display apparatus in accordance with the light-light transfer method by the spatial light modulator of the present invention as shown in FIG. 1 which performs such operations shown FIGS. 7 through 9 and 11, each light-emitting element in the light-emitting element array including N light emitting elements are actuated by the drive circuit DCT to emit in a light-emitting condition shown in FIGS. 9 or 11.

The writing lights emitted from the N pieces of light-emitting element in the light-emitting element array are supplied through the lens L to the swing mirror Mg, and the deflected lights having been focused into the lens L are, in turn, focused into the photoconductive layer PCL in the spatial light modulator SLM.

Since the spatial light modulator SLM is constituted to perform the operations shown in FIGS. 7 through 9 and 11 in accordance with the change of exposure value of the writing light, the reading-out light read out from the spatial light modulator SLM, in which information is written by the writing lights emitted from the N light emitting elements in the light-emitting element array, can display a bright image with a small residual image.

That is with the arrangement of the spatial light modulator SLM shown in FIG. 2, the writing light flux entered from the substrate BP1 side of the spatial light modulator SLM is focused in the photoconductive layer element PCL through the lens L. The photoconductive layer member PCL changes its electric resistance value in accordance with irradiated quantity of light at a portion where said N pieces of writing light flux have focused. Therefore, charge images corresponding to irradiation quantities of the N pieces of writing light having intensities modulated based on the image information to be displayed are formed at the boundary between the photoconductive layer member PCL and the dielectric mirror DML.

That is, charge images are formed in such a manner that a plurality of charges are adequately arrayed so as to have charge amounts corresponding to N pieces of picture information successively applied in the form of serial signals. Accordingly, the N pieces of charge image thus formed between the photoconductive layer member PCL and the dielectric mirror DML cause a field to be applied on the photo-modulation layer member PML in the spatial light modulator SLM.

When the reading-out light RL is entered into a polarization beam splitter PBS after having been emitted from the light source LS of the reading-out light shown in FIG. 1, an S-polarization light component of the reading-out light RL is reflected by the polarization beam splitter PBS toward a reading-out side of the spatial light modulator SLM, and entered from the reading-out side transparent substrate BP2 into the spatial light modulator SLM having the construction shown in FIG. 2.

The reading-out light RL thus entered from the transparent substrate BP2 of the spatial light modulator SLM reaches to the dielectric mirror DML via a route of the transparent substrate BP2→the transparent electrode Et2→the aligning film ALL2→the photo-modulation layer member PML→the aligning film ALL1→the dielectric mirror DML as previously described with reference to FIG. 2. In turn, the reading-out light after having being reflected at the dielectric mirror DML exits the spatial light modulator SLM via a route of the dielectric mirror DML→the aligning film ALL1→the photo-modulation layer member PML→the aligning film ALL2→the transparent electrode Et2→the transparent substrate BP2.

The light flux of the N reading-out lights simultaneously exiting from the spatial light modulator SLM as previously described is a light flux having travelled back in the photo-modulation layer member PML which is applied a field by charge images consisting of arrayed charges with charge amounts corresponding to successive N pieces of picture element information. Therefore, this light flux has polarization planes varied in response to the successive N pieces of picture element information disposed in a row.

The N reading-out lights simultaneously exiting out of the spatial light modulator SLM subsequently enter into the polarization beam splitter PBS. At the same time, a P-polarization light component of above-described incident light is emitted through the polarization beam splitter PBS to the projection lens Lp. Thus, the projection lens Lp projects them on a screen S as N pieces of light spot arrayed in a row.

Consequently, in accordance with the present invention, an operational condition of the spatial light modulator is set in such a manner that the voltage applied between both ends of the photo-modulation layer member becomes a voltage monotonously exceeding a voltage value corresponding to an extreme value of a degree of photo-modulation in a characteristic curve showing a relationship between an applied voltage and a degree of photo-modulation in the photo-modulation layer member, at the timing the writing light of the maximum exposure value is entered into the spatial light modulator.

Therefore, it becomes possible to increase an average quantity of reading-out light without changing an inherent time constant of the component consisting of the photoconductive layer member PCL and the photo-modulation layer member PML of the spatial light modulator SLM.

As a result, a display of an image is carried out with a high utilization ratio of light from the light source in such a manner that the information written in the spatial light modulator is read out by the reading-out light and projected on a screen through a projection-optics system with higher brightness.

Thus, the present invention can solve the previously-described conventional problems.

As this invention may be embodied in several forms without departing from the spirit of essential characteristics thereof the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A light-light transfer method using a spatial light modulator (SLM) which includes a photoconductive layer member (PCL), a photo-modulation layer member (PML) used in a birefringence operating mode, and two electrodes (Et1, Et2) sandwiching said two members (PCL, PML), comprising steps of:

applying a predetermined operation voltage (E) between said two electrodes (Et1, Et2);

generating a writing light (WL) having a light quantity varying from a predetermined minimum value to a predetermined maximum value $(Iw \times \Gamma)$ in accordance with image information to be displayed;

guiding said writing light (WL) into said photoconductive layer member (PCL) so as to cause a voltage drop in said photoconductive layer member (PCL) due to electric resistance change in response to entrance of said writing light (WL), thereby applying a voltage (Vp) between both ends of said photo-modulation layer member (PML), said voltage (Vp) being identical with a value obtained by subtracting said voltage drop from said predetermined operation voltage (E);

adjusting said voltage (Vp) to be larger than a reference voltage when said writing light (WL) having said predetermined maximum value $(Iw \times \Gamma)$ enters into said photoconductive layer member (PCL), said reference voltage being a voltage at which intensity of a reading-out light (RL) takes an extreme value in a characteristic curve $(E_0 \rightarrow A \rightarrow B \rightarrow C)$ showing a relationship between said voltage (Vp) and the intensity of the reading-out light (RL) outputting from said photo-modulation layer member (PML);

introducing the reading-out light (RL) into said spatial light modulator (SLM) so that said reading-out light (RL) is modulated in said spatial light modulator (SLM); and projecting said reading-out light (RL) having been modulated in said spatial light modulator (SLM) on a screen (S).

2. A light-light transfer method in accordance with claim 1, wherein said step of adjusting said voltage (Vp) further adjusts said voltage (Vp) to be smaller than said reference voltage when said writing light (WL) having said predetermined minimum value enters into said photoconductive layer member (PCL).

3. A light-light transfer method in accordance with claim 1, wherein an electric power source supplying said predetermined operation voltage (E) between two electrodes (Et1, Et2) is controlled to change either its frequency or its voltage so as to change an impedance value of the photoconductive layer member (PCL).

4. A display apparatus comprising:

a light-emitting array (REA) including N light-emitting elements disposed in a row in connection with N picture elements;

drive circuit means (DCT) for activating each of said N light-emitting elements to emit a writing light (WL) whose light quantity varies from a predetermined minimum value to a predetermined maximum value $(Iw \times \Gamma)$ on the basis of image information of a corresponding one of N picture elements;

deflecting means (Mg) for deflecting said writing light (WL) emitted from said light-emitting array (REA);

a spatial light modulator (SLM) including a photoconductive layer member (PCL), a photo-modulation layer member (PML) used in a birefringence operating mode, and two electrodes (Et1, Et2) sandwiching said two members (PCL, PML);

a converging means (L) for focusing said writing light (WL) deflected at the deflection means (Mg) on said photoconductive layer member (PCL) in said spatial light modulator (SLM);

said photoconductive layer member (PCL) changing its electric resistance value in accordance with the light quantity of said writing light (WL), thereby applying a voltage (Vp) between both ends of said photo-modulation layer member (PML);

a light source (LS) for generating a reading-out light (RL);

a polarization beam splitter (PBS) reflecting said reading-out light (RL) supplied from said light source (LS) toward said spatial light modulator (SLM);

said reading-out light (RL) being modulated in said spatial light modulator (SLM), so as to have a polarization plane modulated in accordance with said image information;

said polarization beam splitter (PBS) receiving the reading-out light (RL) reflected back from said spatial light modulator (SLM);

a projection lens (Lp) for diffusing said reading-out light (RL) from said polarization beam splitter (PBS) onto a screen (S); and adjusting means for adjusting said voltage (Vp) to be larger than a reference voltage when said writing light (WL) having said predetermined maximum value ($I_w \times \Gamma$) enters into said photoconductive layer member (PCL), said reference voltage being identical with a voltage at which intensity of said reading-out light (RL) takes an extreme value in a characteristic curve ($E_0 \to A \to B \to C$) showing a relationship between the voltage (Vp) applied to said photo-modulation layer member (PML) and the intensity of reading-out light (RL).

5. A display apparatus in accordance with claim 4, wherein said adjusting means further adjusts said voltage (Vp) to be smaller than said reference voltage when said writing light (WL) having said predetermined minimum value enters into said photoconductive layer member (PCL).

* * * * *